(12) United States Patent
Clark et al.

(10) Patent No.: US 12,511,475 B2
(45) Date of Patent: Dec. 30, 2025

(54) FOCI ANALYSIS TOOL (71) Applicant: CAGE TECHNOLOGIES, INC., Tortola (VG)

(72) Inventors: Graham Clark, Kings Lynn (GB); Eric William Hey, Bohol (PH); Anthony Mannella, Niagara Falls (CA); Carl Wimmer, Guadalajara (MX)

(73) Assignee: CAGE TECHNOLOGIES, INC., Tortola (VG)

( * ) Notice: Subject to any disclaimer, the term of this patent is extended or adjusted under 35 U.S.C. 154(b) by 165 days.

(21) Appl. No.: 18/290,882

(22) PCT Filed: Jun. 21, 2022

(86) PCT No.: PCT/IB2022/055766
§ 371 (c)(1),
(2) Date: Jan. 22, 2024

(87) PCT Pub. No.: WO2023/007270
PCT Pub. Date: Feb. 2, 2023

(65) Prior Publication Data
US 2024/0330584 A1  Oct. 3, 2024

Related U.S. Application Data

(60) Provisional application No. 63/225,725, filed on Jul. 26, 2021.

(51) Int. Cl.
*G06F 40/205* (2020.01)
*G06F 16/34* (2019.01)
(Continued)

(52) U.S. Cl.
CPC ......... *G06F 40/205* (2020.01); *G06F 16/345* (2019.01); *G06F 16/36* (2019.01);
(Continued)

(58) Field of Classification Search
CPC ...... G06F 40/205; G06F 16/345; G06F 16/36; G06F 40/279; G06F 40/289; G06F 40/30; G06F 3/04847
(Continued)

(56) References Cited

U.S. PATENT DOCUMENTS 8,874,434 B2 * 10/2014 Collobert ............ G06F 40/289
706/26
11,508,411 B2 * 11/2022 Allibhai ................ G11B 27/36
(Continued)

FOREIGN PATENT DOCUMENTS

CN     106484754 A  *  3/2017  ......... G06F 16/2246
CN     107220296 A  *  9/2017  ............... G06N 3/08
(Continued)

OTHER PUBLICATIONS

Chatel, C. (Authorized officer), International Preliminary Report on Patentability in corresponding International Application No. PCT/IB2022/055766 mailed on Feb. 8, 2024, 5 pages.
(Continued)

*Primary Examiner* — Edwin S Leland, III
(74) *Attorney, Agent, or Firm* — MH2 Technology Law Group LLP (57) ABSTRACT

A method, a system, and a computer-readable medium are provided. Each knowledge fragment in a current window of consecutive sentences of a document are scanned to find a first relatum, a second relatum appearing after the first relatum, and a relation between the first relatum and the second relatum. The computing device keeps track of the first relata found in the current window and corresponding frequencies of occurrence. The current window is slid by a number of consecutive sentences less than a number of sentences in the current window. The keeping track and the sliding are repeated until all knowledge fragments in the
(Continued)

document are scanned. Which of the first relata in corresponding windows is a corresponding prime focus is determined based on a preponderance of their frequencies of occurrence. A visualization is presented showing the prime foci and corresponding windows in which they occur.

20 Claims, 7 Drawing Sheets (51) Int. Cl.
*G06F 16/36* (2019.01)
*G06F 40/279* (2020.01)
*G06F 40/289* (2020.01)
*G06F 40/30* (2020.01)
*G06F 3/04847* (2022.01)

(52) U.S. Cl.
CPC .......... *G06F 40/279* (2020.01); *G06F 40/289* (2020.01); *G06F 40/30* (2020.01); *G06F 3/04847* (2013.01)

(58) Field of Classification Search
USPC .............................................. 704/9
See application file for complete search history.

(56) References Cited

U.S. PATENT DOCUMENTS

| | | | |
|---|---|---|---|
| 11,626,139 B2 * | 4/2023 | Allibhai | G10L 21/10 386/278 |
| 2002/0049692 A1 * | 4/2002 | Venkatram | G06F 16/958 706/45 |
| 2011/0301942 A1 * | 12/2011 | Collobert | G06F 40/289 704/E11.001 |
| 2022/0130421 A1 * | 4/2022 | Allibhai | G06F 3/04842 |
| 2022/0130423 A1 * | 4/2022 | Allibhai | H04N 21/234336 |
| 2024/0330584 A1 * | 10/2024 | Clark | G06F 40/205 |

FOREIGN PATENT DOCUMENTS

| | | | | |
|---|---|---|---|---|
| CN | 108628833 A | * | 10/2018 | ........... G06F 40/258 |
| CN | 111177327 A | * | 5/2020 | |
| CN | 111191460 A | * | 5/2020 | ............. G06N 5/025 |
| CN | 111753167 A | * | 10/2020 | ............. G06F 18/22 |
| CN | 112800221 A | * | 5/2021 | ............. G06N 3/047 |
| CN | 112820411 A | * | 5/2021 | ............. G16H 50/70 |
| CN | 115394295 A | * | 11/2022 | ............. G10L 15/26 |
| CN | 112069796 B | * | 8/2023 | ........... G06F 40/211 |
| WO | 2002033508 A2 | | 4/2002 | |
| WO | WO-0233508 A2 | * | 4/2002 | ........... G06F 16/958 |

OTHER PUBLICATIONS

Yang, J. (Authorized officer), International Search Report and Written Opinion in corresponding International Application No. PCT/IB2022/055766 mailed on Sep. 23, 2022, 6 pages.

* cited by examiner

FOCI ANALYSIS TOOL

This application is the U.S. national phase of PCT Application No. PCT/IB2022/055766 filed in the International Bureau Receiving Office on Jun. 21, 2022, which claims the benefit of U.S. Provisional Application No. 63/225,725, filed in the U.S. Patent and Trademark Office on Jul. 26, 2021.

BACKGROUND

A document tells a story. If it is to make any sense at all, the document has a beginning, intervening development, and a conclusion. Some documents may tell a complicated story. The story may have a series of foci as well as clusters of subsidiary foci around a central focus. As complexity and length of a document's content increases, so does a need for a tool to help a user quickly understand a document's contents, and the various areas of focus in the contents and their relationships to other areas of focus.

SUMMARY

In a first aspect of various embodiments, a computer-implemented method is provided for detecting foci and connections between the foci in a document. A computing device scans knowledge fragments included in a current window of consecutive sentences of a document to find a first relatum, a second relatum appearing after the first relatum, and a relation between the first relatum and the second relatum. The computing device keeps track of the first relatum found in the current window and corresponding frequencies of occurrence thereof. The current window of consecutive sentences is slid by a number of consecutive sentences less than a number of consecutive sentences in the current window of consecutive sentences. The computing device repeats the keeping track and the sliding until all knowledge fragments in the document have been scanned. The computing device determines which of the first relata in corresponding windows is a corresponding prime focus based on a preponderance of the frequencies of occurrence of the first relata. A visualization is presented showing the prime foci and corresponding windows in which the prime foci occur.

In a second aspect of the various embodiments, a system is provided for detecting foci and connections between the foci in a document. The system includes at least one processor, at least one memory, and a bus connecting the at least one processor with the at least one memory. The at least one processor is configured to perform operations. According to the operations, knowledge fragments included in a current window of multiple windows of consecutive sentences of a document are scanned to find, in each respective knowledge fragment, a first relatum, a second relatum appearing after the first relatum, and a relation between the first relatum and the second relatum. The first relata found in the current window are kept track of along with their corresponding frequencies of occurrence. The current window of consecutive sentences is slid by a number of consecutive sentences less than a number of consecutive sentences in the current window of consecutive sentences. The keeping track and the sliding are repeated until all knowledge fragments in the document have been scanned. Prime foci are determined in corresponding windows based on a preponderance of the frequencies of occurrence of the first relata. A visualization is presented showing the prime foci and corresponding windows in which they occur.

In a third aspect of the various embodiments, a non-transitory computer-readable medium is provided that has instructions for at least one processor stored thereon. The instructions configure the at least one processor to perform a number of operations. According to the operations, knowledge fragments in a current window of multiple windows of consecutive sentences of a document are scanned to find, in each respective knowledge fragment, a first relatum, a second relatum appearing after the first relatum, and a relation between the first relatum and the second relatum. The first relata found in the current window are kept track of along with corresponding frequencies of occurrence thereof. The current window of consecutive sentences is slid by a number of consecutive sentences less than a number of consecutive sentences in the current window of consecutive sentences. The keeping track and the sliding are repeated until all knowledge fragments in the document have been scanned. Based on a preponderance of the frequencies of occurrence of the first relata, one of the first relata in corresponding windows is determined to be a corresponding prime focus. A visualization is presented showing the prime foci and corresponding windows in which the prime foci occur.

DETAILED DESCRIPTION

Contents of a document may tell a story. The document may include a beginning, a middle, and an end, each of which includes a number of sentences and each sentence may include one or more knowledge fragments. Each knowledge fragment includes a first relatum, a second relatum, and a relation between the first relatum and the second relatum. "Dog has fur", "cat has whiskers", "boy throws ball", and "man bites dog" are examples of knowledge fragments. In the knowledge fragment "dog has fur", the first and second relatum, respectively, are "dog" and "fur" and the relation is "has". In the knowledge fragment "cat has whiskers", the first and second relatum, respectively, are "cat" and "whiskers" and the relation is "has". In the knowledge fragment "boy throws ball", the first and second relatum, respectively, are "boy" and "ball" and the relation is "throws". In the knowledge fragment "man bites dog", the first and second relatum, respectively, are "man" and "dog" and the relation is "bites".

A prime focus is a collection of consecutive sentences in which a particular first relata has a frequency of occurrence greater than a frequency of occurrence of any other first relata included in knowledge fragments of the collection of sentences. In some embodiments, equivalent first relata may be treated as a same first relatum. For example, in some embodiments, first relata "dog" and "canine" may be treated as a same first relata having either a value of "dog" and/or "canine". In this specification, two relata may be defined as equal if both relata either have a same value or have values that are considered to be equivalent.

A prime focus may be linked to one or more other prime foci and/or may be linked to one or more subsidiary foci. A subsidiary focus is a first relatum that is not a prime focus.

Various embodiments may process contents of a document and present a visualization showing prime foci, related subsidiary foci, and paths indicating relations therebetween to provide a user with an understanding of the contents in a very short period of time.

Figure 1:
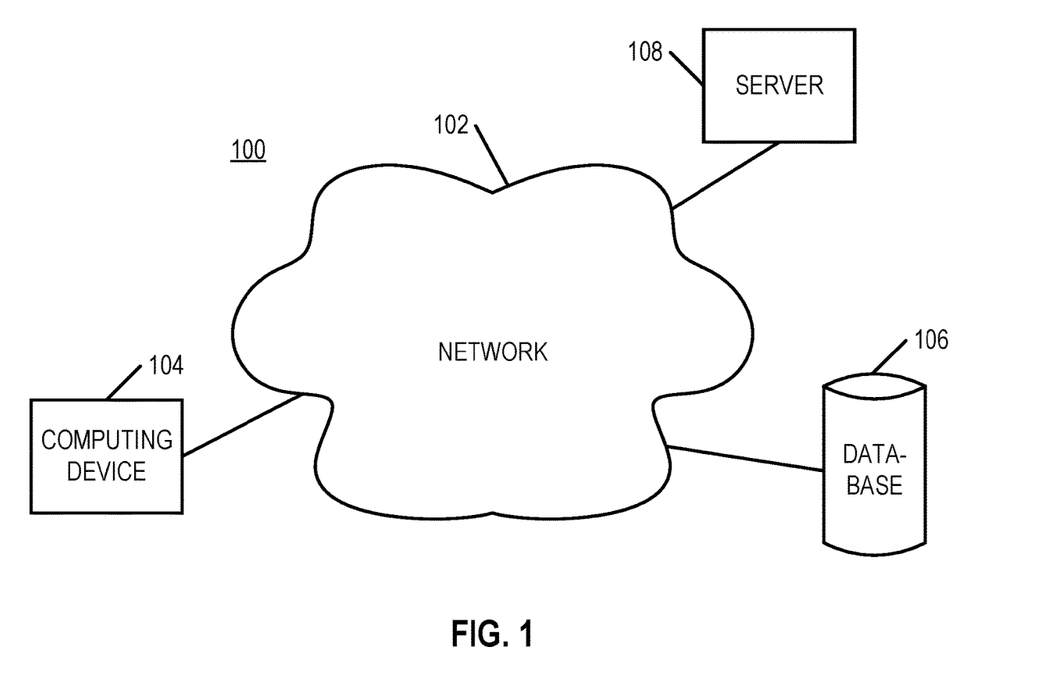
FIG. 1 illustrates an example environment in which various embodiments may be implemented.

FIG. 1 illustrates an example environment 100 in which embodiments may be implemented. Environment 100 may include a network 102, a computing device 104, and a database 106.

Network 102 may be implemented by any number of any suitable communications media (e.g., wide area network (WAN), local area network (LAN), Internet, Intranet, etc.) or a combination of any of the suitable communications media. Network 102 may further include wired and/or wireless networks.

Computing device 104 may include a desktop computer, a laptop computer, a smartphone, a tablet computer, or other type of computing device and may be connected to network 102 via a wired or wireless connection.

Server 108 may include a single computer or may include multiple computers configured as a server farm. The one or more computers of server 108 may include a mainframe computer, a desktop computer, or other types of computers. Server 108 may be connected to network 102 via a wired or a wireless connection.

Database 106 may include a database management system and its contents. In some embodiments, the database management system may be a relational database management system such as, for example, SQL or another database management system. In some embodiments, database 106 may be directly connected with server 108. Server 108 and database 106 may be included in a cloud computing environment in some embodiments.

In some embodiments, a user of computing device 104 may submit a document to server 108, which analyzes contents of the document and provides one or more visualizations to computing device 104 via network 102. In an alternate embodiment, computing device 104 may include a standalone embodiment in which a user selects a document stored on a computer-readable medium of computing device 104, and computing device 104 analyzes contents of the document and presents one or more visualizations to a user via a display screen.

Figure 2:
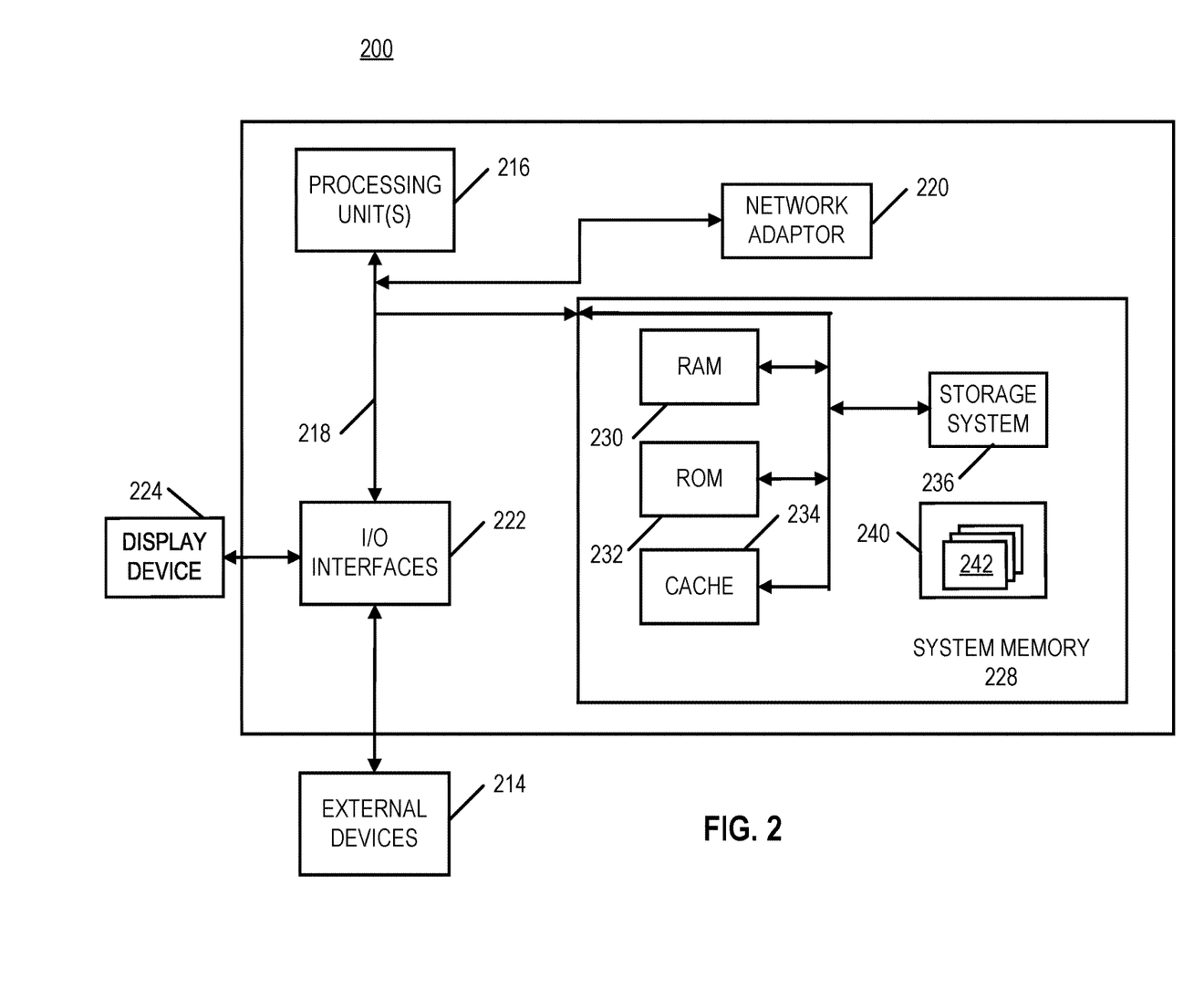
FIG. 2 is a functional block diagram of an example computing system that may implement a computing device and/or a server in various embodiments.

FIG. 2 illustrates an example computing system 200, which may implement any of computing device 104 and/or server 108. Computing system 200 is shown in a form of a general-purpose computing device. Components of computing system 200 may include, but are not limited to, one or more processing units 216, a system memory 228, and a bus 218 that couples various system components including system memory 228 to one or more processing units 216.

Bus 218 represents any one or more of several bus structure types, including a memory bus or memory controller, a peripheral bus, an accelerated graphics port, and a processor or local bus using any of a variety of bus architectures. Such architectures may include, but not be limited to, Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing system 200 may include various non-transitory computer-readable media, which may be any available non-transitory media accessible by computing system 200. The computer-readable media may include volatile and non-volatile non-transitory media as well as removable and non-removable non-transitory media.

System memory 228 may include non-transitory volatile memory, such as random access memory (RAM) 230 and cache memory 234. System memory 228 also may include non-transitory non-volatile memory including, but not limited to, read-only memory (ROM) 232 and storage system 236. Storage system 236 may be provided for reading from and writing to a nonremovable, non-volatile magnetic medium, which may include a hard drive or a Secure Digital (SD) card. In addition, a magnetic disk drive, not shown, may be provided for reading from and writing to a removable, non-volatile magnetic disk such as, for example, a floppy disk, and an optical disk drive for reading from or writing to a removable non-volatile optical disk such as a CD-ROM, DVD-ROM or other optical media. Each memory device may be connected to bus 218 by at least one data media interface. System memory 228 further may include instructions for processing unit(s) 216 to configure computing system 200 to perform functions of embodiments. For example, system memory 228 also may include, but not be limited to, processor instructions for an operating system, at least one application program, other program modules, program data, and an implementation of a networking environment.

Computing system 200 may communicate with one or more external devices 214 including, but not limited to, one or more displays, a keyboard, a pointing device, a speaker, at least one device that enables a user to interact with computing system 200, and any devices including, but not limited to, a network card, a modem, etc. that enable computing system 200 to communicate with one or more other computing devices. The communication can occur via Input/Output (I/O) interfaces 222. Computing system 200 can communicate with one or more networks including, but not limited to, a local area network (LAN), a general wide area network (WAN), a packet-switched data network (PSDN) and/or a public network such as, for example, the Internet, via network adapter 220. As depicted, network adapter 220 communicates with the other components of computer system 200 via bus 218.

It should be understood that, although not shown, other hardware and/or software components could be used in conjunction with computer system 200. Examples, include, but are not limited to, microcode, device drivers, redundant processing units, external disk drive arrays, RAID systems, tape drives, and data archival storage systems, etc.

Figure 3:
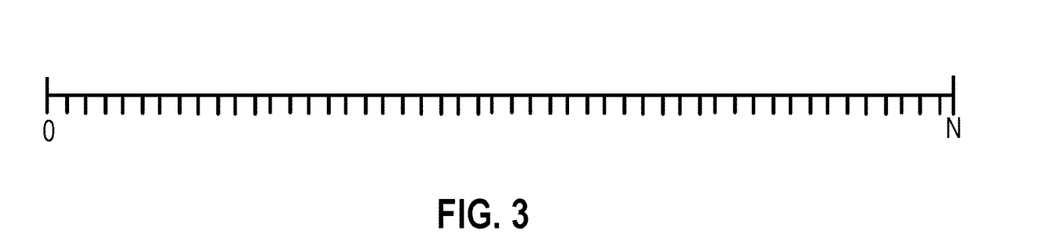
FIG. 3 shows a portion of a display, according to embodiments, representing N consecutive sentences in contents of an example document.
Figure 4:
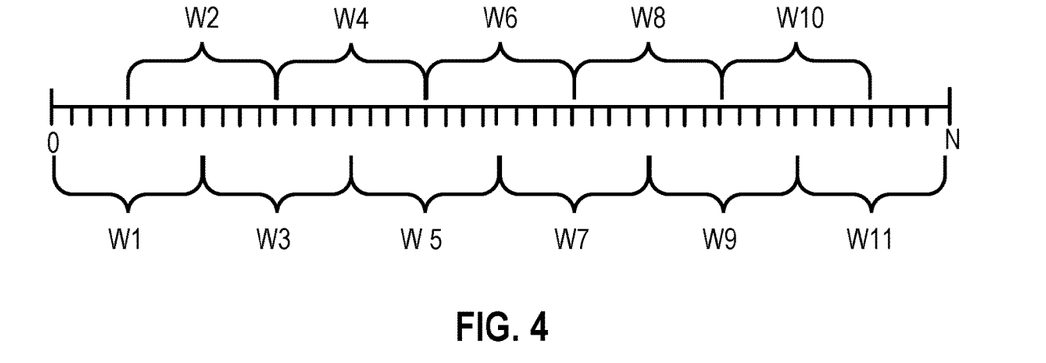
FIG. 4 shows an example of how consecutive sentences of a document may be divided into multiple overlapping windows of consecutive sentences in various embodiments.

In an embodiment, as shown in FIG. 3, computing device 104 or server 108 may prepare a visual presentation of N sentences included in contents of a document provided for analysis. Computing device 104 or server 108 may divide the sentences into a number of sections, or windows, which may overlap. As shown in FIG. 4, an example document may be divided into 11 windows, W1 through W11, each window having eight sentences, and each following window including some of the sentences from an immediately preceding window. For example, FIG. 4 shows window W1 having a first eight sentences of the document, window W2 having eight sentences beginning with a last four sentences of window W1, window W3 having eight sentences beginning with a last four sentences of window W2, window W5 having eight sentences beginning with a last four sentences of window W3, etc. In this example, when a number of remaining sentences not yet assigned to a window are less than half of a window size, then the remaining sentences may be included in a last window of the document such that the last window includes the number of remaining sentences and a last number of sentences from an immediately preceding window such that a window size of the last window has a same window size as other windows of the document. In other embodiments, windows may have a varying number of sentences.

Although the example shown in FIG. 4 has windows of eight sentences with windows overlapping adjacent windows by half of a window size, other embodiments may divide a document into windows having a different number of sentences and with a different number of sentences overlapping adjacent windows.

Figure 5:
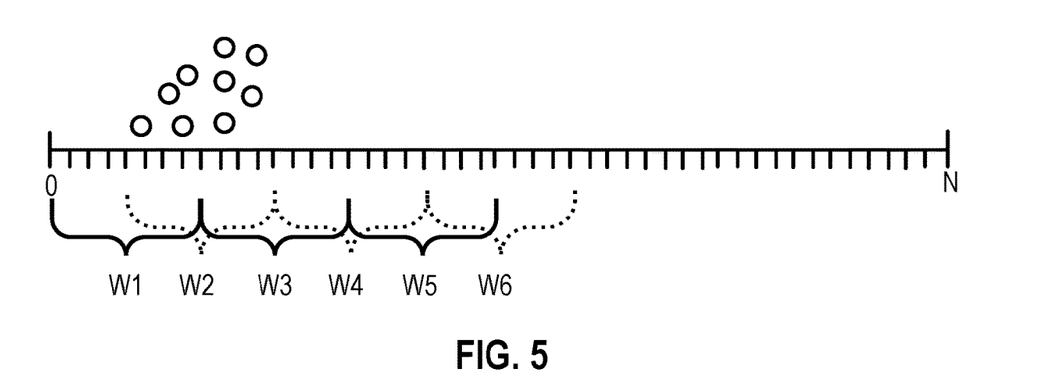
FIG. 5 shows an example presentation according to various embodiments that illustrates occurrences of first relata having same or equivalent values with indications of sentences in which the first relata occur, as well as corresponding windows of consecutive sentences in which the first relata occur.

FIG. 5 shows window W1 having four first relata (shown as small circles) with a same or equivalent values in knowledge fragments of sentences included in the window W1. Assuming that the four first relata outnumber a frequency of other first relata with other values in knowledge fragments of sentences included in the window W1, then the value(s) of these four first relata may become a prime focus candidate. Sliding a current window to adjacent window W2, which overlaps with the window W1, five more first relata are detected having the same or the equivalent values with respect to the four first relata of window W1. Thus, window W2 has nine first relata with the same or the equivalent values. Assuming that the same or the equivalent values of these first relata occur more frequently than other values of other first relata in windows W1 and W2, then the same or the equivalent values of the nine first relata become the prime focus in windows W1 and W2.

Figure 6:
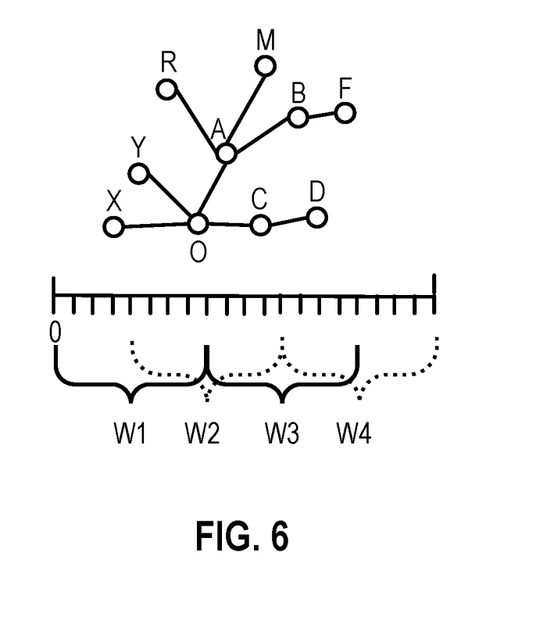
FIG. 6 illustrates a central focus O, or alternatively, a selected prime focus O, and related foci, as illustrated by paths between the related foci.

Various embodiments may determine a central prime focus of a document. A central prime focus is a prime focus located at an approximate central location of contents of the document. Other first relata having either a direct or indirect relation with the central prime focus may be determined. That is, first relata in knowledge fragments of the document having a related second relatum with a value of the central prime focus are considered to be directly related to the central prime focus. Other first relata in knowledge fragments having a second relatum with a value of a first relatum that is related to another second relatum having a relation through one or more other relata to the central prime focus are considered to be indirectly related to the central prime focus. FIG. 6 shows an example display screen showing a central prime focus O with direct relations to relata X, Y, A and C. Relatum D has an indirect relation with central prime focus O through relatum C. Relata R, M and B have an indirect relation with central prime focus O via relatum A. Relatum F has an indirect relation with central prime focus O via relata B and A. Lines between relatum are paths representing relations between the relatum.

In some embodiments one of the prime foci may be selected from a display such as, for example, a display as shown in FIG. 5 or another display. Other first relata having either a direct or indirect relation with the selected one of the prime foci may be determined. That is, first relata in knowledge fragments of the document having a related second relatum with a value of the selected one of the prime foci are considered to be directly related to the central prime focus. Other first relata in knowledge fragments having a second relatum with a value of a first relatum that is related another second relatum having a relation through one or more other relata to the selected one of the prime foci are considered to be indirectly related to the selected one of the prime foci. If prime focus O is the selected one of the prime foci, then FIG. 6 may be seen as an example display screen showing the selected one of the prime foci O with direct relations to relata X, Y, A and C, an indirect relation with relatum D through relatum C, indirect relations with relata R, M and B via relatum A, and an indirect relation with relatum F via relata B and A. Lines between relata are paths representing relations between the relata.

Figure 7:
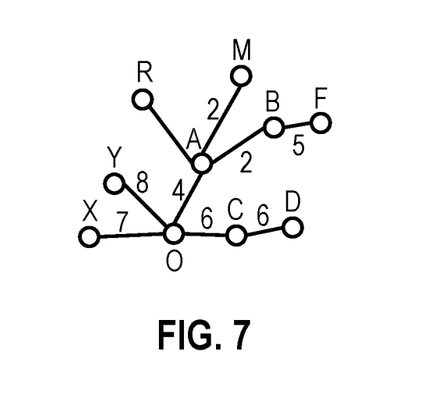
FIG. 7 is similar to FIG. 6, but further includes example strengths of relations for corresponding paths between related foci.

In some embodiments, a filter may be set to hide items in a visualization. In one embodiment, the filter may hide paths and foci based on a strength or weight of a relation between foci. For example, as shown in FIG. 7, a displayed numerical value appearing next to a path may indicate a strength or weight of a relationship. In some embodiments, higher numerical values indicate a stronger relation or greater weight between relata than lower numerical values. In other embodiments, lower numerical values may indicate a stronger relation or greater weight between relata. Some other embodiments may indicate a strength or weight of a relation by showing one or more letters such as "L" for low, "M" for medium, and "H" for high, or yet other letters with different strength or weight meanings. A strength or weight of a relation may be determined by one or more words used to describe the relation. In some embodiments, groups of one or more words describing relations may have a strength or weight configurable by a user. Thus, a strength or weight of a relation may be determined by the one or more words that describe the relation, and may be different for different users.

In some embodiments, words that appear in relata may be configured by a user to have assigned strengths or weights. An associated filter may be set to a desired value and relata that normally would be displayed in a visualization may become hidden if the assigned weight or strength of the word or groups of words associated with the relata is less than the associated filter setting. Paths to such relata also may become hidden in the visualization.

In some embodiments, an entity that wishes its employees to have access to certain ways of approaching a search for meaning in a document may configure a set of weights or strengths and an associated filter that may be changed only by one or more certain authorized employees. In such embodiments, employees other than the one or more authorized employees then would only be able to view visualizations in a certain way that serves interests of the entity as may be determined by a certain governing group of the entity. The weights configured by the one or more certain authorized employees according to the certain governing group are referred to as frozen weights, while weights that are configurable on a per employee or user basis are referred to as freely selectable weights.

Figure 8:
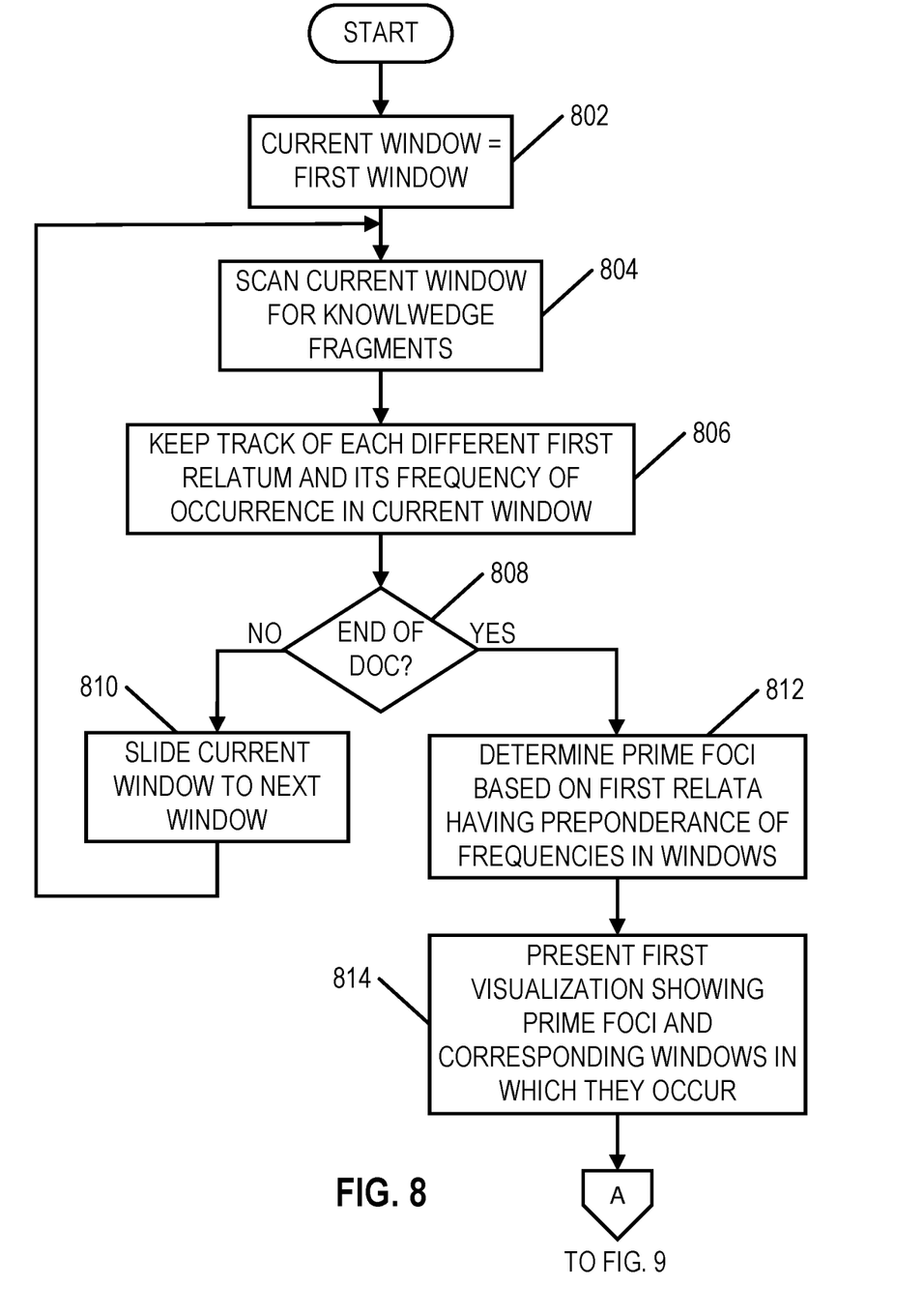
FIGS. 8 and 9 are flowcharts of an example process for finding prime foci in contents of a document, determining relations among foci, determining strengths of relations, and providing visualizations of foci and relations therebetween.
Figure 9:
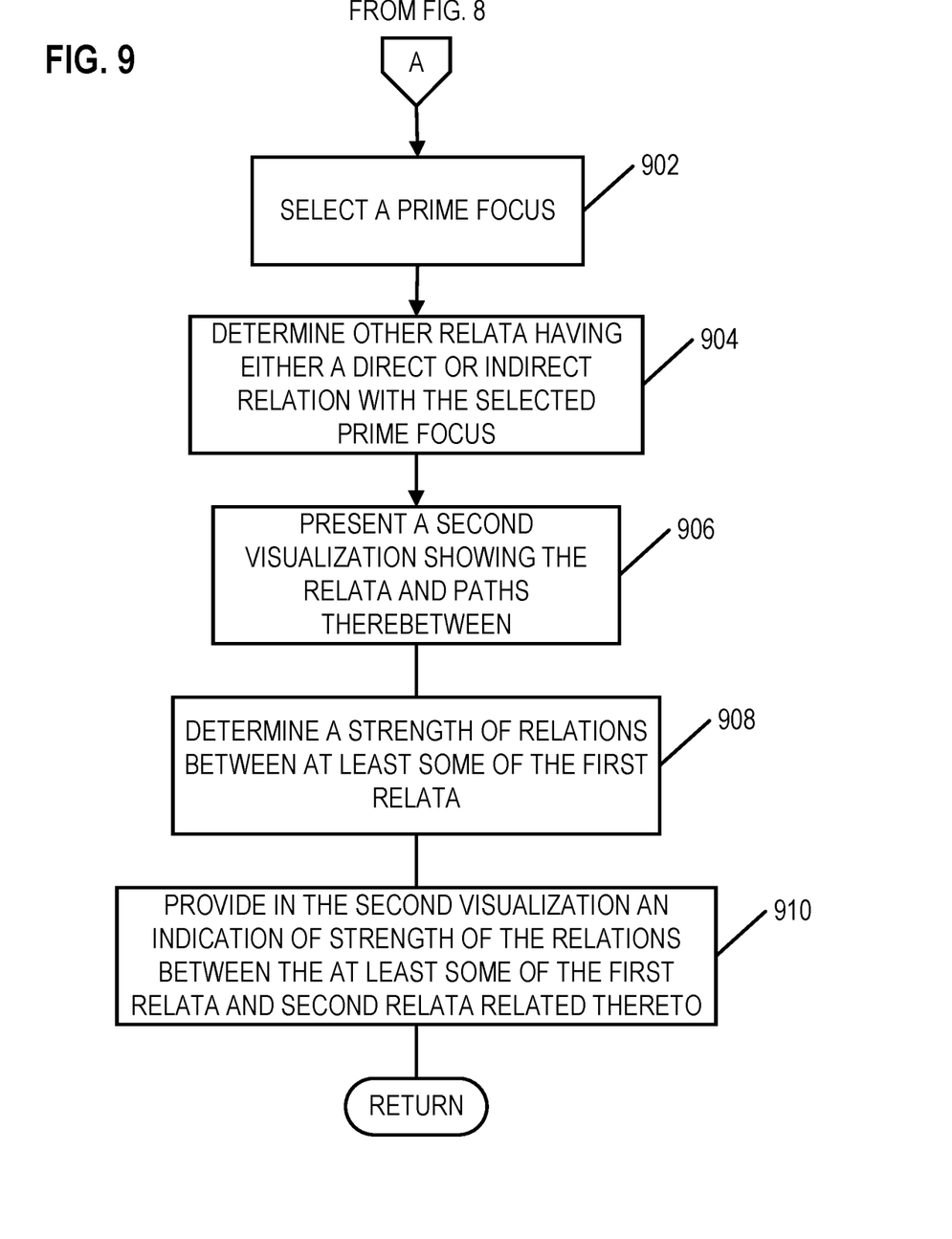

FIGS. 8-9 are flowcharts of an example process that may be implemented in some embodiments for determining a prime focus of a window. The process may begin with setting a current window to a first window at a beginning of contents of a document (act 802). The current window then may be scanned for knowledge fragments (act 804) and a list of unique first relata values and equivalents and corresponding frequencies of occurrence in the current window may be determined and maintained (act 806).

Next, a determination may be made regarding whether an end of the document has been reached (act 808). If the end of the document has not been reached, then the current window may be slid to a next adjacent window (act 810) and acts 804-808 may be repeated.

If, during act 808, a determination is made that the end of the document has been reached, then prime foci may be determined for windows based on a first relata value and its equivalent values having a preponderance of frequencies of occurrences in windows (act 812).

Next, a first visualization may be presented on a display screen showing prime foci and corresponding windows in which they occur (act 814). In some embodiments, the first visualization may be similar to that shown in FIG. 5. That is, an indication of prime foci in the windows in which they occur may be displayed as circles or other indications. In some embodiments, each indication may be labeled with one or more alphanumeric characters and a legend may be displayed showing each of the labels and a corresponding prime focus value.

Next, a central prime focus may be determined by finding a prime focus in an approximate central portion of contents of a document, or alternatively, a prime focus may be selected via a graphical user interface using a pointing device (act 902; FIG. 9), which may be a computer mouse, a trackball device, a user's finger on a touch screen, or other type of pointing device. Other relata may be determined having either a direct or indirect relation with the central prime focus, or alternatively, a direct or indirect relation with the selected prime focus, as previously described (act 904). Other first relata related to the central prime focus, or the selected prime focus, may be considered to be subsidiary foci in subsidiary knowledge fragments. A second visualization may be presented on a display screen showing the central prime focus (or the selected prime focus), related first relata, and paths therebetween (act 906).

In some embodiments, a strength of relations between at least some of the first relata may be determined (act 908). The strength of relations may be determined by words used to express the relation as previously described. A second visualization may be provided on a display screen to indicate a strength of various relations between at least some of the first relata (act 910), as shown in FIG. 7 as previously described.

As previously mentioned, in some embodiments, words that appear in relata may be configured by a user to have assigned strengths or weights. An associated filter may be set to a desired value and relata that normally would be displayed in a visualization may become hidden if the assigned weight or strength of the word or groups of words associated with the relata is less than the associated filter setting. Paths to such relata also may become hidden in the visualization.

In some embodiments, stronger strengths may be indicated by higher numbers. In other embodiments, stronger strengths may be indicated by lower numbers. Still, in other embodiments, words such as "high", "medium", and "low" (or the initials "h", "m", and "l") may indicate strengths of relations. Other embodiments may indicate strengths by other means.

Figure 10:
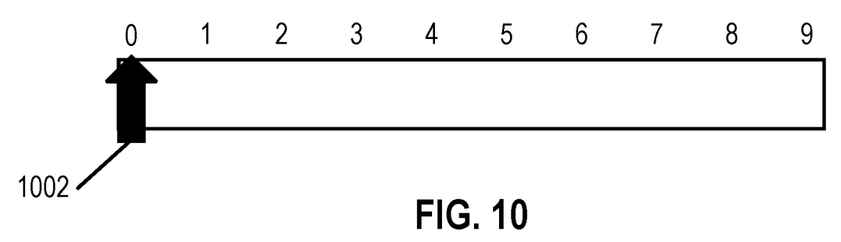
FIG. 10 illustrates an example graphical user interface showing a slider for setting a value of a strength filter according to various embodiments.

As mentioned previously, in some embodiments, a strength filter may be provided. The strength filter may include a user interface that displays a slider showing various strength settings. FIG. 10 illustrates an example strength filter showing 10 possible strength settings 0-9. An indicator such as, for example, indicator 1002, may be moved to a desired strength filter setting by selecting, with a pointing device, indicator 1002 and dragging indicator 1002 to the desired strength filter setting. The pointing device may be a computer mouse, a trackball, a user's finger on a touch screen display, or other device for selecting and moving indicator 1002. When the strength filter associated with relations between relata or foci is set to a value, paths having strength values less than the set value may be hidden in a visualization. In addition, any relata or foci and paths that do not have a visible path to a selected prime focus may be hidden in the visualization.

In some embodiments, a visualization may be saved in response to receiving a command via a user interface. In one embodiment, a right click of a pointing device on the visualization may display a menu that includes a command to save the visualization. Selecting this command using the pointing device may cause the visualization to be saved.

Figure 11:
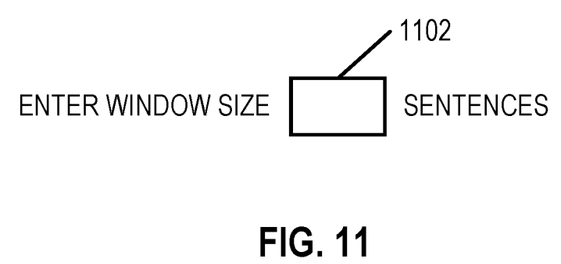
FIG. 11 shows an example graphical user interface for setting a window size for analyzing contents to determine foci.

FIGS. 4 and 5 show examples in which contents of a document was divided into windows of 8 sentences, wherein adjacent windows overlapped by a number of sentences less than a window size such as, for example, 4 sentences. In some embodiments, a graphical user interface may be provided to permit a user to set the window size. FIG. 11 shows an example graphical user interface for setting a window size. In this example interface, a user may select input box 1102 with a pointing device and may input a numerical value to set the window size to a desired number of sentences. In some embodiments, the window size may be set to an integer value that is greater than or equal to 2 and less than or equal to 22. In other embodiments, a different minimum integer value and maximum integer value may be permitted.

Adjacent windows may overlap by a number of sentences less than the window size. In some embodiments, the adjacent windows may overlap by about half the window size. For example, if the window size is an even number E, then the adjacent windows may overlap by E/2 sentences. Otherwise, if the window size is an odd number O, then the adjacent windows may overlap by (O+1)/2 sentences. In other embodiments, adjacent windows may overlap by a different amount of the window size.

In other embodiments, a graphical user interface for setting the window size may be provided in a form of a slider, similar to the slider shown in FIG. 10, but with a lowest numerical setting being a minimum allowed window size and a highest numerical setting being a maximum allowed window size. The window size may set by selecting an indicator with a pointing device and sliding the indicator to a desired window size.

In other embodiments, other graphical user interfaces may be provided for setting the window size.

As analysis through contents of a document takes place, foci may or may not be discovered based on the window size. For example, a window size of 5 sentences has a statistically smaller probability of isolating a focus than a window size of 20 sentences. Thus, a user may start by setting a larger window size such as, for example, 18 sentences and may run an analysis of the contents. The user may then set the window size to a smaller number of sentences such as, for example, 14 sentences and may rerun the analysis. Further, the user may start the analysis with a small window size such as, for example, 4 sentences, may increase the window size to, for example, 8 sentences and rerun the analysis, and may further increase the window size to, for example, 12 or 16 sentences and rerun the analysis. By setting different window sizes and running or rerunning the analysis, the user can discover which window size is best for determining foci with a minimum amount of noise (extraneous or irrelevant clutter).

Various embodiments provide users with a quick understanding of document contents in a very short amount of time. For example, prime foci and relations among prime foci, subsidiary foci, and other relata can be easily understood via multiple visualizations. An ability to select a prime focus among multiple prime foci and be presented with relations to other prime foci and subsidiary foci provides a powerful tool for a user to understand various themes and relations among the themes.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Aspects of the present invention are described herein with reference to flowchart illustrations and/or block diagrams of methods, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for detecting foci and connections between the foci in a document, the computer-implemented method comprising:
scanning, by a computing device, knowledge fragments included in a current window of a plurality of windows of consecutive sentences of the document to find a first relatum, a second relatum appearing after the first relatum, and a relation between the first relatum and the second relatum;
keeping track, by the computing device, of the first relata found in the current window and corresponding frequencies of occurrence thereof;
sliding, by the computing device, the current window of consecutive sentences by a number of consecutive sentences less than a number of consecutive sentences in the current window of consecutive sentences;

repeating, by the computing device, the keeping track and the sliding until all knowledge fragments in the document have been scanned;

determining, by the computing device, which of the first relata in corresponding windows is a corresponding prime focus based on a preponderance of the corresponding frequencies of occurrence of the first relata; and presenting, by the computing device, a visualization showing the prime foci and the corresponding windows in which the prime foci occur.

2. The computer-implemented method of claim 1, further comprising:

determining other relata having one of a direct relation and an indirect relation with a selected one of the prime foci.

3. The computer-implemented method of claim 2, further comprising:

determining, by the computing device, paths among the relata, each of the paths connecting a respective first relatum with a second relatum having a relation with the respective first relatum; and presenting, by the computing device, a second visualization showing the relata and the paths therebetween.

4. The computer-implemented method of claim 3, further comprising:

determining, by the computing device, a strength of relations between at least some of the first relata and second relata related thereto, wherein:

the presenting of the second visualization further comprises:

providing an indication of the strength of the relations between the at least some of the first relata and the second relata related thereto.

5. The computer-implemented method of claim 4, further comprising:

providing, by the computing device, a graphical user interface to facilitate entering of a strength filter setting;

hiding, by the computing device, each of the paths in the second visualization corresponding to a relation between a respective first relatum and a corresponding second relatum having a strength weaker than the strength filter setting;

hiding, by the computing device, each respective path of the paths in the second visualization that does not have any visible path connecting the respective path with the selected one of the prime foci; and saving, in response to receiving a command via a user interface, the second visualization with at least one path hidden in the second visualization based on the strength filter.

6. The computer-implemented method of claim 5, wherein the graphical user interface includes a slider having a sliding indicator movable by selecting and dragging the sliding indicator to a desired strength filter setting.

7. The computer-implemented method of claim 5, further comprising:

permitting only one or more certain authorized users to configure a strength of a relation based on or more words that describe the relation; and permitting only the one or more certain authorized users to configure the strength filter setting.

8. A system for detecting foci and connections between the foci in a document, the system comprising:

at least one processor;
at least one memory; and a bus connecting the at least one processor with the at least one memory, wherein the at least one processor is configured to perform operations comprising:

scan knowledge fragments included in a current window of a plurality of windows of consecutive sentences of the document to find in each respective knowledge fragment a first relatum, a second relatum appearing after the first relatum, and a relation between the first relatum and the second relatum;

keep track of the first relata found in the current window and corresponding frequencies of occurrence thereof;

slide the current window of consecutive sentences by a number of consecutive sentences less than a number of consecutive sentences in the current window of consecutive sentences;

repeat the keeping track and the sliding until all knowledge fragments in the document have been scanned;

determine which one of the first relata in corresponding windows is a corresponding prime focus based on a preponderance of the corresponding frequencies of occurrence of the first relata; and present a visualization showing the prime foci and the corresponding windows in which the prime foci occur.

9. The system of claim 8, wherein the operations further comprise:

determine other relata having one of a direct relation and an indirect relation with a selected one of the prime foci.

10. The system of claim 9, wherein the operations further comprise:

determine paths among the relata, each of the paths connecting a respective first relatum with a second relatum having a relation with the respective first relatum; and present a second visualization showing the relata and the paths therebetween.

11. The system of claim 10, wherein the operations further comprise:

determine a strength of relations between at least some of the first relata and second relata related thereto, wherein:

the presenting of the second visualization further comprises the at least one processor being configured to perform additional operations comprising:

provide an indication of the strength of the relations between the at least some of the first relata and the second relata related thereto.

12. The system of claim 11, wherein the operations further comprise:

provide a graphical user interface to facilitate entering of a strength filter setting;

hide each of the paths in the second visualization corresponding to a relation between a respective first relatum and a corresponding second relatum having a strength weaker than the strength filter setting;

hide each respective path of the paths in the second visualization that does not have any visible path connecting the respective path with the selected one of the prime foci; and save, in response to receiving a command via a user interface, the second visualization with at least one path hidden in the second visualization based on the strength filter.

13. The system of claim 12, wherein the graphical user interface includes a slider having a sliding indicator movable by selecting and dragging the sliding indicator to a desired strength filter setting.

14. The system of claim 12, wherein the operations further comprise:
permit only one or more certain authorized users to configure a strength of a relation based on or more words that describe the relation; and
permit only the one or more certain authorized users to configure the strength filter setting.

15. A non-transitory computer-readable medium having instructions for at least one processor stored thereon, the instructions configuring the at least one processor to perform operations comprising:
scanning knowledge fragments included in a current window of a plurality of windows of consecutive sentences of a document to find in each respective knowledge fragment a first relatum, a second relatum appearing after the first relatum, and a relation between the first relatum and the second relatum;
keeping track of the first relata found in the current window and corresponding frequencies of occurrence thereof;
sliding the current window of consecutive sentences by a number of consecutive sentences less than a number of consecutive sentences in the current window of consecutive sentences;
repeating the keeping track and the sliding until all knowledge fragments in the document have been scanned;
determining which one of the first relata in corresponding windows is a corresponding prime focus based on a preponderance of the corresponding frequencies of occurrence of the first relata; and
presenting a visualization showing the prime foci and the corresponding windows in which the prime foci occur.

16. The non-transitory computer-readable medium of claim 15, wherein the operations further comprise:
determining other relata having one of a direct relation and an indirect relation with a selected one of the prime foci.

17. The non-transitory computer-readable medium of claim 16, wherein the operations further comprise:
determining paths among the relata, each of the paths connecting a respective first relatum with a second relatum having a relation with the respective first relatum; and
presenting a second visualization showing the relata and the paths therebetween.

18. The non-transitory computer-readable medium of claim 17, wherein the operations further comprise:
determining a strength of relations between at least some of the first relata and second relata related thereto, wherein:
the presenting of the second visualization further comprises:
providing an indication of the strength of the relations between the at least some of the first relata and the second relata related thereto.

19. The non-transitory computer-readable medium of claim 18, wherein the operations further comprise:
providing a graphical user interface to facilitate entering of a strength filter setting;
hiding each of the paths in the second visualization corresponding to a relation between a respective first relatum and a corresponding second relatum having a strength weaker than the strength filter setting;
hiding each respective path of the paths in the second visualization that does not have any visible path connecting the respective path with the selected one of the prime foci; and
saving, in response to receiving a command via a user interface, the second visualization with at least one path hidden in the second visualization based on the strength filter.

20. The non-transitory computer-readable medium of claim 15, wherein the operations further comprise setting a window size of the plurality of windows via a second graphical user interface.

* * * * *